(No Model.)
D. M. MAXON.
SPROCKET WHEEL.
No. 439,535. Patented Oct. 28, 1890.
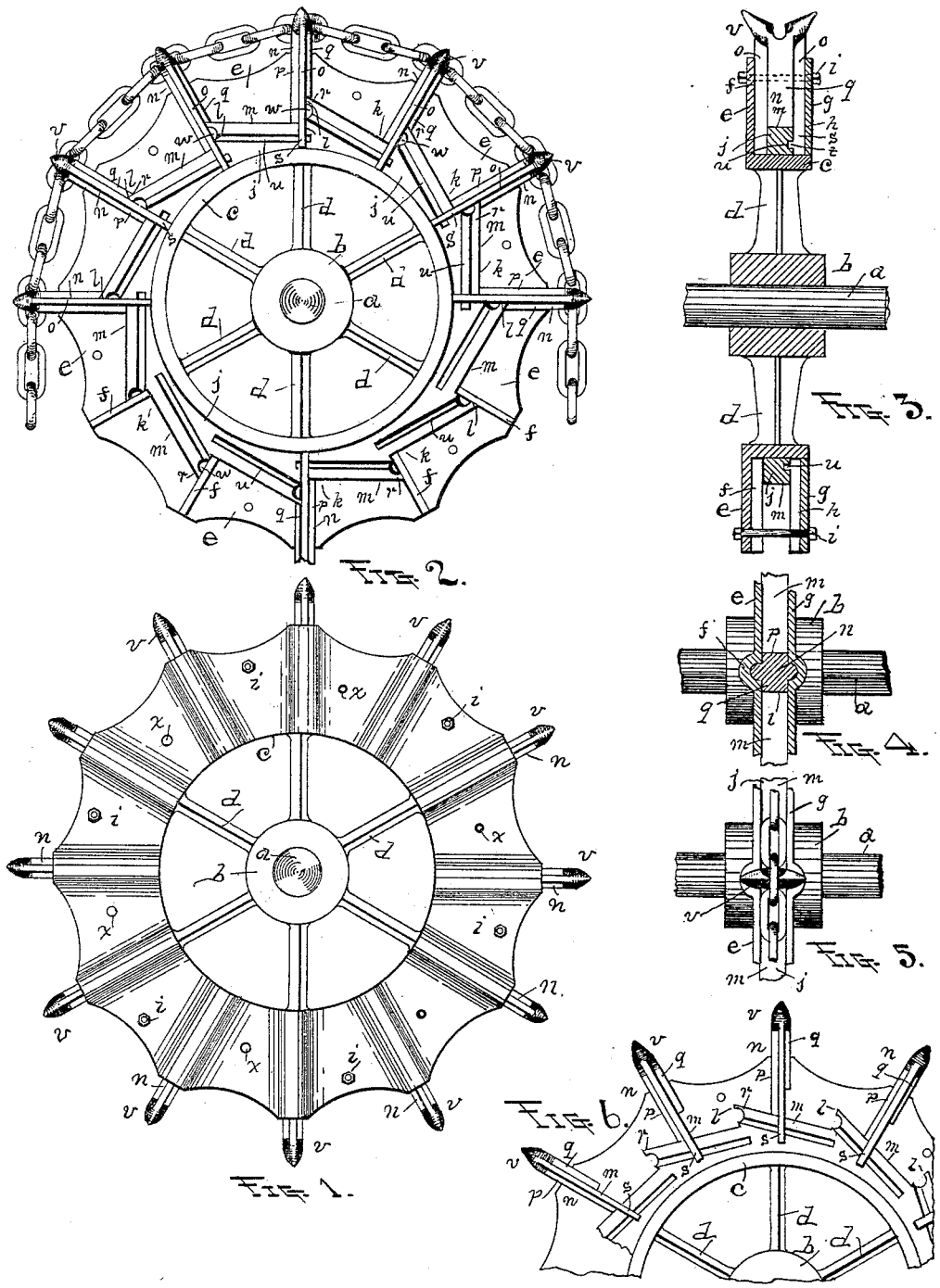

UNITED STATES PATENT OFFICE.

DANIEL M. MAXON, OF BAY CITY, MICHIGAN, ASSIGNOR OF ONE-HALF TO JAMES McKEON, OF SAME PLACE.

SPROCKET-WHEEL.

SPECIFICATION forming part of Letters Patent No. 439,535, dated October 28, 1890.

Application filed February 4, 1890. Serial No. 339,162. (No model.)

*To all whom it may concern:*

Be it known that I, DANIEL M. MAXON, a citizen of the United States, residing at Bay City, in the county of Bay and State of Michigan, have invented certain new and useful Improvements in Sprocket-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in sprocket-wheels, and pertains more especially to devices for enlarging or diminishing the diameter of sprocket-wheels which are used in endless chain or other cable for power-transmitters.

The object of the invention is to construct and arrange a sprocket-wheel for carrying an endless-chain conveyer or power-transmitter which is composed of common oval links in a form that as the links of the chain wear and elongate or as the sprockets become worn the sprockets may be moved outwardly from the hub in a manner to change the distance between the sprockets so as to compensate for the wear of the links.

Another object of the invention is to provide a wheel having sprockets with devices whereby each and all of the series of sprockets may be moved outwardly on radial lines simultaneously and in unison and to the same distance, whereby the pitch-line of the sprockets will remain equidistant from the center of the wheel; and another object is to provide an easy and effective means of moving the teeth of a sprocket-wheel on radial lines and of quickly and easily securing the said teeth in position after the adjustment thereof.

The invention consists in the combination, the form, and the construction of the several parts which I use in the formation of the device, and which will be hereinafter more fully explained, and will be also specifically pointed out in the claims of this specification.

In order to attain the objects aforesaid, I employ the devices illustrated in the accompanying drawings, in which will be found the same letters of reference indicating the same parts throughout the several views, and in which—

Figure 1 represents a side view in elevation of my improved sprocket-wheel. Fig. 2 is the same with a portion of one side and also with a portion of the sprockets removed. Fig. 3 is a transverse section of Fig. 2. Fig. 4 is an edge view of a portion of the rim of the wheel with the sprocket-arm in section. Fig. 5 is a view of a portion of the rim of the wheel and showing the end of one of the sprockets in position with the chain engaged therewith. Fig. 6 is a side view of a portion of the wheel and showing the position of the parts when the sprockets are partly expanded.

$a$ represents a shaft, and $b$ is the hub of a wheel, (shown herein as mounted upon the shaft,) and $c$ is the rim of the wheel, and $d$ are spokes; or a web may be used, if preferable, instead of the spokes. From one side edge of the rim projects a radial flange $e$, which is formed integral with the rim or is rigidly secured thereto, as preferred, and $f$ are a series of radial grooves formed in the inner side face of the flange $e$, the grooves being equidistant from each other, and are of a number to correspond to the number of sprocket-teeth required in the wheel. Upon the opposite edge of the rim $c$ is arranged a removable flange $g$, which is provided on its inner side face with a series of radial grooves $h$, which are arranged and located directly opposite the grooves $f$, and are of the same dimension and contour, and the flange $g$ is held in position by a series of bolts $i$, which pass transversely through both flanges and are located in any desired position between the adjacent grooves.

$j$ is a ring fitted with an inside opening to pass over and surround the rim $c$ between the flanges, the flange $g$ being removed to allow the ring to be passed upon the rim, and the outer face or periphery of the ring is provided with a series of triangular notches $k$, one side $l$ of the notches coinciding with the radial lines of the wheel, while the other side $m$ of the notches are sloping from the bottom of one radial side $l$ to the top of the next adjacent side $l$, and may be formed either with a straight surface, as herein illustrated, or the surface may be of a convex or other form, as may be desired.

$n$ are a series of arms, having laterally-projecting rib portions $o$, which are fitted to lie in the radial grooves $f$ and $h$, and the front and rear portions $p$ and $q$ project between the flanges $e$ and $g$, one portion $q$ being preferably stopped off to rest upon the high portion or tooth $r$ of the ring $j$, while the opposite portion $p$ rests with its end upon the upper surface $m$ of the notches.

The lower portion $s$ of one of the ribs $o$ extends downwardly on the outer side of the ring $j$, and on the inner side of the portion $s$ is provided a boss $t$, which projects into one of a series of grooves $u$, which are formed in the side face of the ring $j$, and which are arranged to lie parallel with the surfaces $m$ of the notches. The outer ends of these arms $n$ are provided with sprockets $v$ of a form to properly engage with the links of a chain of any suitable or desired form, those herein shown being adapted for use with the common oval-link variety. The lower portion of the side $l$ of the notch is provided with a notch $w$ cut out, and one of the radial flanges is provided with a series of openings $x$, cut through promiscuously, one at least coinciding with one of the notches $w$ when the rim is located in the position shown in Fig. 2.

The parts are placed in position with the inner ends of the arms $n$ resting upon the lowest portion of the notches $k$, and the flange $g$ is then firmly secured in position by bolts $i$, which draw the flanges toward each other until they press firmly against the opposite outer edges of the ribs $o$, and the parts are thereby firmly held in position, and the wheel is ready for mounting and operation, the chain being carried by the sprockets in the ordinary way, the size of wheel and space between the sprockets, of course, being adapted to the size of chain which it is to operate.

Of course it is well known that an endless chain operating upon sprockets is constantly wearing away at the ends of the links which interlock with each other, and that the space of the links, therefore, change from wear, so that with a common sprocket-wheel the chain soon begins to "climb" or "slip" upon the teeth; but with my improvement when the links are slightly worn the bolts $i$ are slightly loosened, and then a bar or lever is inserted through one of the openings $x$ and engaged with the notch $w$, and then by operating the bar as a lever the ring is slightly revolved, and the sloping surfaces $m$ of the notches then operate to raise all of the arms $n$ outwardly on radial lines, which slightly increases the distance between the sprockets $v$, so that they are again located in a position to properly engage with the links of the chain, and the bolts $i$ are then again tightened, and the parts are solidly held in position as before, and as a further wear of the links obtains the operation is again repeated and the arms again expanded until the chain is worn out. The parts are then returned to their original position and a new chain substituted.

It will be seen, of course, that by this means an endless chain may be used as a transmitter until the links are greatly weakened by wear, and the operation of the chain upon the sprockets is always uniform and even, as the teeth can be so adjusted as to always engage with the proper links without slip or jerk or liability of climbing upon the teeth, so that while a much greater service may be obtained from the chain a more uniform and satisfactory operation of the mechanism is also obtained.

Of course it will be observed other varieties of endless cable may be used instead of the chain described herein by changing the form of the sprockets $v$ to properly receive and support the cable and the operation of the wheel will be the same, and the wheel may be constructed in any convenient form and not depart from the invention so long as one of the peripheral flanges is made removable to allow the ring to be placed in position upon the periphery of the wheel, and, if desired, the boss $t$ can be omitted from the sprocket-arms, and the arms will then be held in position by the bolts $i$ clamping the flanges tightly upon the lateral sides of the arms.

Having described my invention, what I claim as new, and desire to secure by Letters Patent, is—

1. The combination of the wheel having on each side a radially-projecting flange, each flange being provided with a series of radial grooves on its inner side face and opposite each other, a loose ring between the said flanges and provided on its periphery with a series of notches having sloping sides, a series of radial arms between the said flanges, with their inner ends resting on the sloping side of the notches and having on opposite sides laterally-projecting ribs resting in the said radial grooves, and provided on their outer ends with sprocket-teeth for carrying a cable, and devices for securing the said arms in position, substantially as described.

2. The combination of the wheel provided on each side with radially-projecting peripheral flanges, one of which is removable, as described, the said flanges being provided with a series of radial grooves on their inner side faces and opposite each other, a loose ring between the said flanges, and provided on its periphery with a series of notches corresponding to the series of radial grooves, and each notch having a sloping surface facing outwardly, a series of radial arms having their lateral sides fitted to pass into the said radial grooves and with their inner ends resting on the said sloping surfaces of the notches on the ring, and provided on their outer ends with sprocket-teeth fitted to carry a cable, and bolts passed transversely through the said flanges between the arms for clamping the parts together, substantially as set forth.

3. The combination of the wheel provided on opposite sides with radially-projecting flanges, one of which is removable, and both flanges being provided on their inner side faces with a series of radial grooves located opposite each other, a ring loosely surrounding the wheel between the said flanges and provided on its periphery with a series of notches having inclined or sloping faces, and provided on its side face with a series of inclined grooves $u$, a series of arms fitted to rest in the said radial grooves in the flanges and with their lower ends resting upon the said inclined faces of the ring and having portions projecting from their lower ends below the said notches, and provided on their inner sides with bosses $t$, projecting into the grooves, and the bolts $i$, for clamping the parts together, substantially as set forth.

In testimony whereof I affix my signature in presence of two witnesses.

DANIEL M. MAXON.

Witnesses:
JAS. E. THOMAS,
F. A. MCKAY.